INVENTOR.
PIERRE GANCEL
BY
Sheldon F. Raizes
ATTORNEY

Oct. 18, 1966 P. GANCEL 3,279,564
DISC BRAKES
Filed Aug. 3, 1964 2 Sheets-Sheet 2
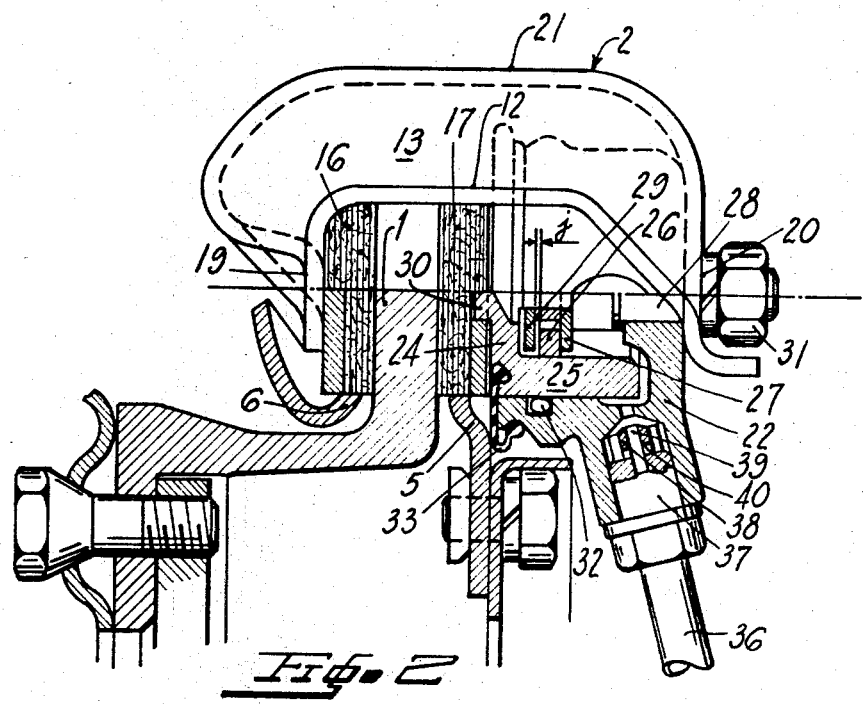
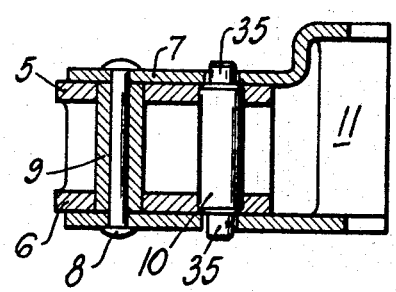
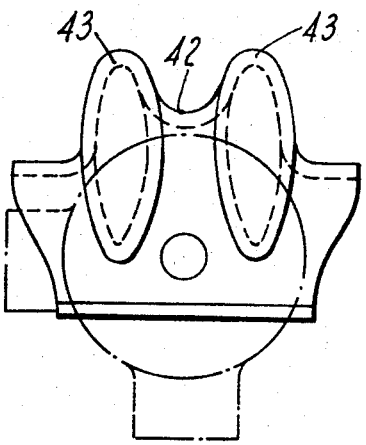
INVENTOR.
PIERRE GANCEL
BY
Sheldon F. Raizes
ATTORNEY

3,279,564
DISC BRAKES
Pierre Gancel, Paris, France, assignor to Societe Anonyme
D.B.A., Paris, France, a company of France
Filed Aug. 3, 1964, Ser. No. 387,086
Claims priority, application France, Aug. 3, 1963, 943,687
4 Claims. (Cl. 188—73)

The invention relates to disc brakes of the type in which the axial reaction, generated during the brake application by the actuator device such as an hydraulic cylinder applying the adjacent friction pad against the disc, is absorbed by a fixed caliper, viz a floating saddle straddling the disc and covering only a small portion of the disc periphery.

Different solutions have been proposed for this construction. In certain brakes, particularly in those in which the actuator comprises an hydraulic cylinder located on only one side of the disc, the saddle is formed as a casting with an integrally made cylinder body. In such a construction it is necessary to provide a passage in the area of the saddle opposed to that of the cylinder to enable the passage of the cylinder machining tools. The passage formed opposite to the cylinder reduces the strength of the saddle, and as a result there appear distortions during the application of the brake which determine an unequal wear of the friction pads. This default is even amplified in disc brakes with a caliper the two limbs of which are each formed with a passage to accommodate the respective cylinder.

In other constructions, the hydraulic cylinder or cylinders are removably secured in place by means of screws or pins which are subjected to withstand the whole torque generated during the application of the brake. The safety is depending, in this case, on the proper fastening of said screws or pins. Now if it is relatively easy in the factory to control the steel quality of the screws or pins and the locking torque thereof at the works, this is not the case in the repair shops, wherein no control means are provided.

Another drawback of the said constructions consists in the distortion on the one hand of the screws, and pins as well as of the nonsupported cylinder portions on the other hand, said distortions inducing an increase of the liquid volume absorbed by the brake and which results in a reduction of the brake efficiency.

The drawbacks referred to above affect brakes comprising a movable saddle with one sole cylinder on one side of the disc, as well as brakes having two cylinders connected on opposite sides of the disc to a fixed caliper formed by two limbs interconnected by screws etc. It is necessary to provide assembly screws adapted to satisfy the safety requirements. The steel quality and the locking torque have to comply with proper standards, and as in the preceding construction the lack of skill during overhaul operations is to be anticipated.

One object of this invention is to provide a spot-type disc brake which enables the suppression of the drawbacks inherent to the prior brakes, and which is of simple and economical construction.

According to the invention, the saddle viz the caliper is formed as a sheet iron single stamping which straddles the hydraulic cylinder or cylinders, the closed bottom thereof is arranged to take abutment on the internal surface of the stamping wall substantially parallel to the disc. Thus the axial reaction due to the application of the friction pads is transmitted direct to the opposite wall in question, without the intermediary of screws, pins or other assembly means.

The said stamping is preferably formed as a box structure adapted to be located above the disc, and having an open side directed towards the interior of the brake. In a brake having a movable saddle, the cylinder actuating the adjacent friction pad takes abutment on a box structure wall parallel to the disc, while the opposite box structure wall acts as an abutment for the second friction pad adapted to be brought into engagement with the disc by a displacement of the said saddle due to the reaction exerted onto said saddle during the cylinder actuation. The box structure transverse walls may be bent with respect to the diametrical plane of the stamping.

The stamping may also be formed as a closed box in which the wall directed towards the disc is provided at one end thereof with an aperture enabling the passage of an hydraulic cylinder which like in the embodiment described above, is partially located in the box structure.

In an application of the said stamping to a construction including two opposite cylinders, the other cylinder may be located in the closed box structure and through another aperture formed in the opposite wall directed towards the disc.

The transverse walls of the box structure may be reinforced by ribs integrally made with the latter and said ribs may be adapted to cooperate with guiding surfaces provided on the fixed support, particularly through the intermediary of resilient blocks inserted between said ribs and guiding levers provided on the fixed support as described in the pending patent application.

The limbs and the outer portion of the stamping may also be reinforced by ribs having an appropriate shape.

The use of a sheet iron stamping acting as an abutment for the closed end of the cylinder or cylinders presents advantages: it enables the location of metal in the regions in which the presence thereof is necessary as well as the use of stamping portions having the thickness required to build up the strength of the unit, thus reducing the weight of the latter, while in castings the thickness of the portions is defined not by considerations of resistance of the material, but by the requirements of the art of casting. According to the invention the use of iron sheet stampings enable the direct forming on the walls thereof, without any machining operation, of an abutment surface for the closed cylinder end.

Since the closed hydraulic cylinder end only takes abutment on the stamping wall but does not extend through said wall, the strength of the stamping is not weakened due to the absence of the aperture which was necessary in the prior brakes for the passage of the cylinder as is the case in the brakes with removable cylinders. For the same reason, it is also possible to adapt cylinders having different diameters on the same stamping without having to modify the latter. The rigidity of the wall opposite to the cylinder in floating saddle brakes is not weakened, since no aperture is required in said wall to enable the passage of tools for the machining of the cylinder.

Of course, it is necessary to provide means for assembling the cylinder with the stamping but since the object of the stamping is to act as an abutment for the closed cylinder end, this assembly means does not need to be very resistant. A screw disposed in the cylinder axis may be used. The cylinder may also be fixed by means of a pin forming part of an automatic adjuster device. This way of the cylinder assembly presents the advantage of enabling the variation of the direction of the cylinder location with respect to the stamping which makes possible an easy adaptation of the brake to different types of vehicles, since it is possible to compensate the inclination of the unit by adequately positioning the bleeding and feeding bosses of the cylinder.

Other features and advantages of the invention will become apparent from the following specification taken in connection with the accompanying drawings in which:

FIGURE 2 is a sectional view on line 2—2 of FIG. 1;

FIGURE 3 is a sectional view on line 3—3 of FIG. 1 and showing the particulars of the locking means for the guiding levers;

FIGURE 4 shows another embodiment of the stamping shown in FIGURES 1 and 2.

Figure 1:
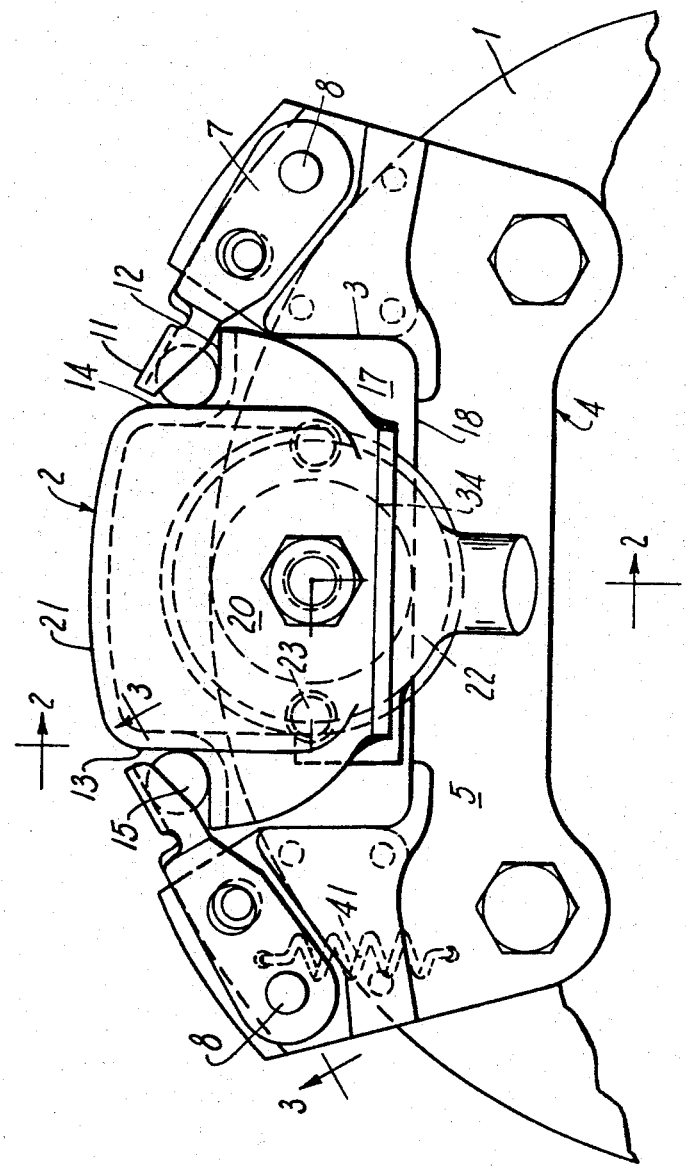
FIGURE 1 is a side view of a disc brake embodying the invention.

The brake shown in the drawing comprises a disc 1 connected to the hub of a wheel. The brake is equipped with a floating saddle indicated generally in 2 and formed by a stamping straddling the disc and located in a recess 3 provided in the fixed support 4 which is U-shaped and includes two limbs 5 and 6 arranged on the opposite sides of the disc and in which are formed the recesses 3. The inner portion of the limb 6 is folded outwardly in order to form an angle with the said limb. The movement of the saddle in the axial direction is guided by the fixed support and particularly by means of a pair of retractable guiding levers 7 each of which is formed by two parallel arms respectively arranged on the opposite sides of limbs 5 and 6 forming part of the fixed support, and pivoted on the latter by means of a pin 8 extending through a hole formed in the two limbs 5 and 6. A tubular space member 9 surrounds the pin 8. The guiding levers 7 are locked in their operative position shown on the drawing by means of a clevis pin 10, in which position hooks 11 bridging the ends of said arms take support on projections 12 formed on the transversal walls 13 and 14 of the saddle by means of elastomeric blocks 15 compressed between said projections and the hooks formed on the said guiding levers. The bearing surfaces formed on the hooks 11 are inclined at such an angle with respect to the fixed support that the resilient blocks 15 exert a force biasing the saddle towards the interior of the brake and applying the friction pads 16, 17 on a seat 18 provided on the bottom end of the recess 3.

The saddle 2 is manufactured from sheet iron realized as a single integrally made stamping having two lateral walls 19, 20 parallel to the disc. These lateral walls adjacent to the transversal walls 13, 14 are integrally made with the peripheral portion 21 in order to form a stamped box structure which presents, in the embodiments shown on the drawings, one side thereof opened towards the interior of the brake. The use of a stamped box has the advantage of locating the metal in the portions wherein it is necessary to insure the adequate strength and enables the use of iron sheet of minimum thickness but which is however sufficient to resist adequately to the torque generated during the brake application.

The lateral wall 20 of the stamping forming the saddle 2 acts as an abutment for the hydraulic cylinder 22 which actuates the adjacent friction pad 17, and the imperforate opposite lateral wall 19 which extends for a substantial length towards the interior of the brake provides an adequate abutment for the opposite friction pad 16 which pad is connected to said lateral wall 19 by means of two bosses 23 provided on said lateral wall. In the embodiment shown in the drawings, the saddle 2 thus straddles the cylinder 22 and the pair of friction pads 16, 17 actuated by said cylinder, whereby the cylinder 22 takes direct abutment on the lateral wall 20 of the saddle without intervention of screws, bolts or other attachment means. The axial reaction generated during the application of the brake is thus exerted onto both walls 19, 20 of the stamped saddle.

The cylinder has a construction similar to that disclosed in said patent application U.S. 299,246 filed on August 1, 1963, now abandoned. The cylinder 22 is equipped with a piston 24 formed with a skirt 25 which is in engagement with a friction ring 26 mounted with a lost motion connection j provided between a shoulder 27 formed on a central pin 28 carried by the closed end of said cylinder on the one hand, and a stop ring 29 fixed at the end of said pin. The piston 24 has a central boss 30 which is engaged into a cavity formed in the adjacent friction pad 17.

The reaction generated by the cylinder actuation is directly transmitted to lateral wall 20 by the closed end of the cylinder, the latter may be fixed in any manner whatsoever to the lateral wall 20 of the stamping forming the saddle by means of central pin 28 at the external end of which a nut 31 is screwed.

The guiding levers may be biased by springs towards the interior of the brake. These springs may be formed by pull springs 41, as shown on FIGURE 1, which are inserted between said levers and the fixed support. The attachment point of said springs on the levers can be selected in such a manner with respect to the pivot axis of said levers, that during the angular movement assigned to the respective lever, the attachment point of the spring after having passed through the dead-point in which the attachment point on the lever is aligned with the pivot axis of the lever, said spring 41 keeps said lever in the retracted position. In this embodiment, the resilient blocks are replaced by blocks made from a material having a low coefficient of friction and which is subject to a low distortion feature.

The embodiment shown on FIGURE 4 of the drawing is provided with a stamped saddle similar to that which was described with reference to FIGURES 1 and 2. The peripheral portion 42 of this saddle is formed with reinforcement ribs 43 for increasing the rigidity of the saddle.

The stamping as described above can be used as a fixed caliper including two opposite cylinders arranged in line and the closed ends thereof take abutment onto the two lateral walls of the said stamping. While the embodiment of the present invention constitutes preferred forms, it is to be understood that other forms might be adopted.

I claim:

1. A spot type disc brake including a rotatable disc, a fixed support in fixed axial relation thereto consisting of two limbs each extending adjacent to one friction surface of the disc, outwardly opening recesses arranged in register in the respective limbs and extending over a minor portion of the disc, first and second friction pads located in said recesses; actuating means including cylinder means on one side of the disc in operative connection with said first friction pad, and a caliper formed as a box with an open side directed towards the disc for straddling the disc, cylinder and first and second friction pads, said caliper having two lateral walls substantially parallel to the disc surfaces and two transversal walls substantially perpendicular thereto which are all made integral with a peripheral top portion, one of said lateral walls serving as an abutment for said cylinder means and the other lateral wall serving as an abutment for said second friction pad, and the said two transversal walls having their edges turned outwardly to form substantially circumferential extensions for operative connection with guide levers pivotally secured to the fixed support, said guide levers urging said caliper radially inwardly relative to said disc.

2. A spot type disc brake as claimed in claim 1 wherein said actuating means is defined by a blind cylinder having a rear end wall with the outer surface thereof in abutting engagement with said one lateral wall, and a cup-shaped piston located within said cylinder and arranged in operative engagement with said first friction pad.

3. A spot type disc brake as claimed in claim 2 and further including a pressurized fluid feed portion in said cylinder leading to a fluid pressure operated chamber provided between the inner surface of said rear end wall and said cup-shaped piston, said feed portion being directed outwardly of said caliper.

4. A spot type disc brake as claimed in claim 2 wherein said rear end wall is formed with an opening, a pin projecting through said opening and the outer end thereof is secured to said one lateral wall, said pin extending within the cup-shaped piston and cooperating with a friction ring engaging the inner periphery of said cup-shaped piston.

References Cited by the Examiner

UNITED STATES PATENTS

| | | | |
|---|---|---|---|
| 2,711,802 | 6/1955 | Davis | 188—152 |
| 2,799,367 | 7/1957 | Dotto | 188—152 |
| 3,064,768 | 11/1962 | Dotto | 188—73 X |
| 3,081,843 | 3/1963 | Dotto et al. | 188—73 |
| 3,134,459 | 5/1964 | Burnett et al. | 188—73 |
| 3,182,754 | 5/1965 | Hahm et al. | 188—73 |

FOREIGN PATENTS

| | | |
|---|---|---|
| 145,332 | 2/1952 | Australia. |
| 77,016 | 11/1962 | France. |
| 703,213 | 1/1954 | Great Britain. |

MILTON BUCHLER, *Primary Examiner.*

G. E. A. HALVOSA, *Assistant Examiner.*